United States Patent [19]

Young

[11] 4,022,540

[45] May 10, 1977

[54] FRANGIBLE AIRFOIL STRUCTURE

[75] Inventor: Eric A. Young, Cincinnati, Ohio

[73] Assignee: General Electric Company, Cincinnati, Ohio

[22] Filed: Oct. 2, 1975

[21] Appl. No.: 618,795

[52] U.S. Cl. .................................. 415/9; 415/160; 55/306

[51] Int. Cl.² .................................. F01B 25/16

[58] Field of Search .......... 415/9, 160; 416/2, 224, 416/229, 230; 60/226, 262, 39.31; 55/306

[56] References Cited

UNITED STATES PATENTS

| | | | |
|---|---|---|---|
| 1,142,916 | 6/1915 | Scott | 415/9 |
| 1,364,197 | 1/1921 | Heath | 416/230 |
| 2,362,804 | 11/1944 | Cox, Jr. | 416/2 |
| 3,113,430 | 12/1963 | Beale et al. | 60/39.31 |
| 3,215,511 | 11/1965 | Chisholm et al. | 416/224 |
| 3,294,366 | 12/1966 | Coplin | 416/224 |
| 3,403,893 | 10/1968 | Stoffer | 416/224 |
| 3,628,890 | 12/1971 | Sayre | 416/224 |
| 3,758,234 | 9/1973 | Goodwin | 416/230 |
| 3,856,434 | 12/1974 | Hoffmann | 416/224 |

FOREIGN PATENTS OR APPLICATIONS 1,233,730  5/1971  United Kingdom ............... 416/224

*Primary Examiner*—Henry F. Raduazo
*Attorney, Agent, or Firm*—Dana F. Bigelow; Derek P. Lawrence

[57] ABSTRACT

An inlet guide vane for a turbofan engine comprises a principal airfoil portion fabricated of metal and a radially outward and rearward corner portion fabricated of a frangible material which is attached to the metal portion and completes the airfoil structure. When foreign objects are ingested into the airstream to cause the closely spaced fan blades to deform forwardly to impact against the inlet guide vane, the frangible rearward corner of the inlet guide vane is caused to break off into small pieces and pass through the system without causing any significant secondary damage, thereby leaving the principal portion of the inlet guide vane to function as a relatively efficient airfoil.

7 Claims, 3 Drawing Figures

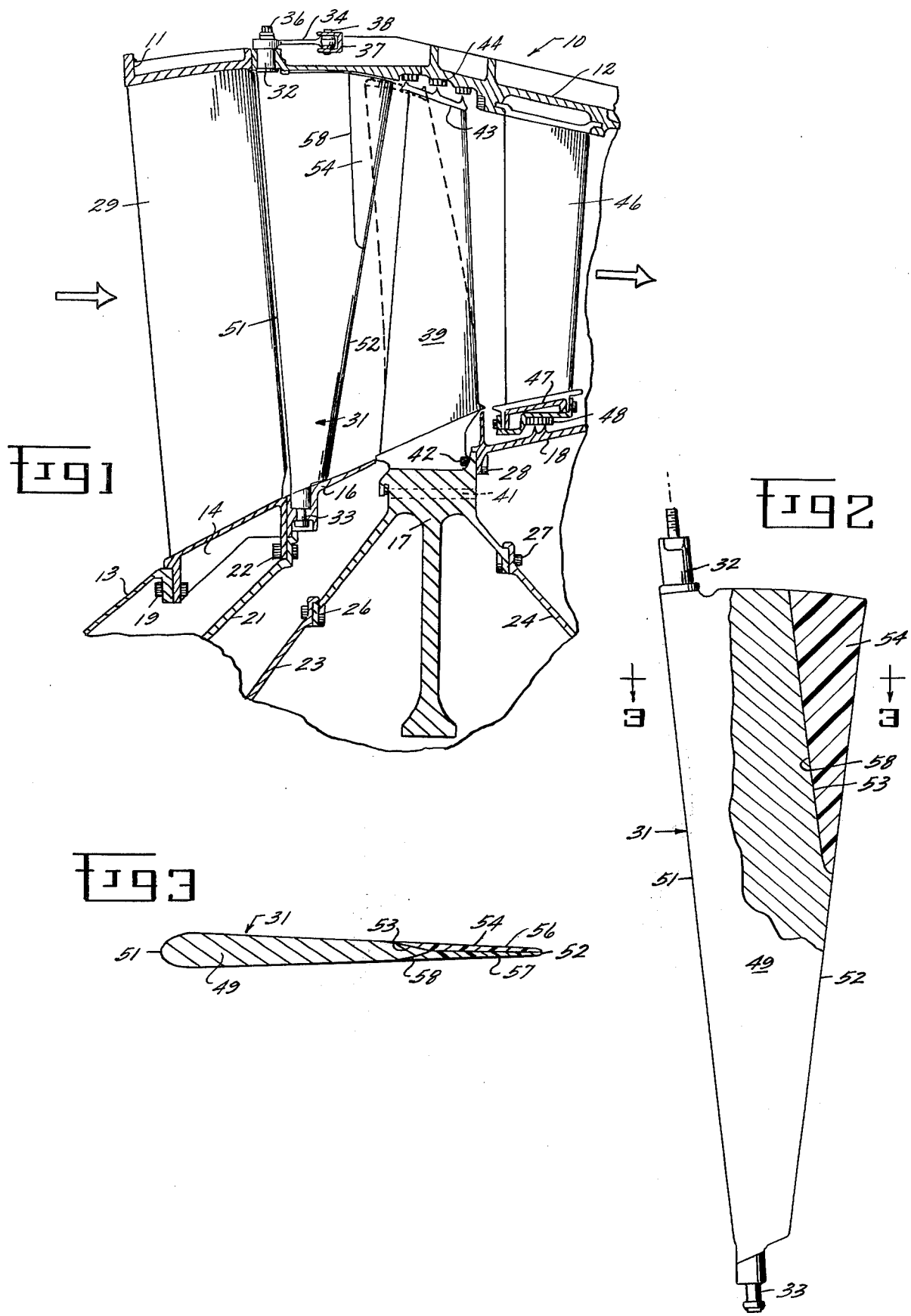

FRANGIBLE AIRFOIL STRUCTURE

BACKGROUND OF THE INVENTION

This invention relates generally to turbomachine airfoils and, more particularly, to an inlet guide vane structure for a turbofan engine.

The invention herein described was made in the course of or under a contract, or a subcontract thereunder, with the United States Department of the Air Force.

In turbofan engines comprising alternate stages of stationary and rotating airfoils, it is desirable to have the stages relatively closely spaced in the axial direction in order to minimize the length of the engine. This is particularly true where there is a plurality of stages and, therefore, multiple axial spacing.

The effort to minimize the axial spacing, however, is somewhat limited by the requirement for blade deflections during conditions in which foreign objects such as birds and ice are ingested into the main airflow stream. Since these ingestion loads generally exert both a circumferential and an axially forward component of force to the blades, an accommodating axial clearance must be provided which results in increased engine length and weight, or alternatively, an interference will occur between the rotating and stationary airfoils. If the latter circumstance is allowed to occur, the impact between these interfering elements tends to cause significant damage to both the rotor and the stator blading and is likely to cause secondary damage resulting from the passing of severed parts through the system.

A particular turbofan structure which is susceptible to this phenomenon is a multiple-stage fan having a plurality of inlet guide vanes located upstream thereof for controlling the direction of and possibly the volume of air which enters the system. Upon the ingestion of a significant foreign object, the stage one rotor blades tend to deflect forwardly causing them to strike the downstream portion of the stationary inlet guide vane. The impact may result in significant damage to the rotor blade, in which case the engine would have to be shut down because of the imbalance problem or, alternatively, it may cause significant damage to the inlet guide vane which would tend to decrease the effectiveness and efficiency of that airfoil. In either case, it is likely that large sections of either the rotating blade or the inlet guide vane would pass through the system and cause significant secondary damage to the downstream system.

The problems brought about by ingestion loading become more pronounced in aircraft which are designed to operate at high velocities and low altitudes where the number of foreign objects encountered tend to be numerous. If sufficient axial clearance is provided to allow for the blade deflections, the resulting increase in engine length and weight may very well be unacceptable.

It is therefore an object of this invention to provide a turbofan engine with reduced sensitivity to foreign object damage.

It is another object of this invention to provide a turbofan engine with minimum engine length and weight characteristics.

It is yet another object of this invention to provide for the axial deflection or deformation of rotating blades within a turbofan engine without causing substantial damage to the engine.

It is still another object of this invention to provide for axial deformation of blading and resultant impact thereof with the stationary airfoil without causing substantial secondary damage to the system.

These objects and other features and advantages become more readily apparent upon reference to the following description when taken in conjunction with the appended drawings.

SUMMARY OF THE INVENTION

Briefly, in accordance with one aspect of the invention, a radially extending airfoil is comprised principally of a metal airfoil portion and having an attached corner fabricated from a frangible material and adapted to break off in small pieces when impacted by an axially adjacent blade. Relative deformation, and resulting impact can thus occur between the airfoils without causing any substantial damage to either airfoil and without causing any substantial secondary damage to the downstream system.

By another aspect of this invention, a stationary inlet guide vane of a turbofan engine has its radially outer and rearward corner fabricated from a frangible material adapted to break into small pieces when impacted by the stage one rotor blade which is deflected forward by the ingestion of foreign objects. In this way, little or no damage results to the rotating blade, only a very small portion of the inlet guide vane is removed to permit the remaining portion thereof to sufficiently act as an airfoil, and the fragmented pieces pass through the downstream system without any significant damage resulting thereto.

By yet another aspect of this invention the frangible tip trailing edge of an inlet guide vane is comprised of a graphite-epoxy composite which is bonded to a metal flap, with the bond being spaced at a minimum axial distance forward of that plane to which the first stage rotor blade is expected to move when deformed forwardly by the maximum expected ingestion load. By minimizing the size of the frangible portions, that portion of the inlet guide vane which remains to act as an airfoil is maximized in size, and the likelihood of secondary damage occurring to the downstream system is minimized.

In the drawings as hereinafter described, the preferred embodiment is depicted; however, various other modifications and alternate constructions can be made thereto without departing from the true spirit and scope of the invention.

BRIEF DESCRIPTION OF THE DRAWINGS

FIG. 1 is a fragmented sectional view of a turbofan engine in which the present invention is incorporated.

FIG. 2 is an elevational view of an inlet guide vane element of the present invention with a portion thereof broken away to show the bonding of the two-material elements.

FIG. 3 is a sectional view thereof as seen along line 3—3 of FIG. 2.

DESCRIPTION OF THE PREFERRED EMBODIMENT

Referring now to FIG. 1, the invention is shown generally at 10 as applied to a turbofan engine having a fan duct for conducting the flow of air in the direction indicated by the arrows in a manner well known in the art. The duct is partially defined by an annular front fan frame 11 and a fan stator case 12, which are interconnected in serial flow relationship to form the outer side of the duct. The radially inner boundary of the duct is partially defined by the serially connected conical centerbody 13, hub 14, shroud flap ring 16 and stage 1 and stage 2 discs 17 and 18, respectively. The centerbody 13 is interconnected to the forward portion of the hub 14 by way of a plurality of bolts 19, and the rear portion of the hub 14 is interconnected to the shroud flap ring 16 and a bearing support housing 21 by way of bolts 22. The first stage fan disc 17 has connected thereto by way of bolts 26 and 27, forward and aft stub shafts 23 and 24, respectively, and the stage two disc 18 is interconnected to the rear end thereof by bolts 28.

Within the fan duct there is a plurality of radially extending struts 29 interconnecting the front fan frame 11 and the hub 14. These struts are rigidly aligned in an axial direction so as to provide the maximum amount of structural support to the combination while offering a minimum amount of air resistance to the airflow stream.

Immediately downstream of the struts 29 is a circumferentially spaced row of fan stator inlet guide vanes, or flaps 31, which serve to direct the flow of air in the desired direction so as to obtain the maximum efficiency from fan blades disposed downstream thereof. The flaps 31 are mounted on radial axes by way of outer and inner trunnions 32 and 33. The pitch of the flap is varied by selectively rotating the flap about its axes by way of a vane actuator arm 34, which is connected to the flap at its one end by the nut 36 and connected to the actuation ring 37 at its other end by way of a pin 38. By selective movement of the actuation ring 37, the pitch of the plurality of flaps 31 may be varied to control the direction and volume of the airflow in the duct in a manner well known in the art.

Immediately downstream of the flaps 31 is a row of circumferentially spaced, substantially radially extending fan blades 39 which are rigidly fastened at their inner end to a disc 17 by way of blade retainers 41 and 42 in a manner well known in the art. At the radially outer end of each of the blades 39 is a seal 43 which engages a honeycomb structure 44 within the fan stator case to provide a sealing relationship therebetween. In normal operation, the disc 17 and attached blades 39 are rotated at a high rate of speed to pump air through the duct, with the blades maintaining a generally radial position as shown in FIG. 1. It is during abnormal periods of operation that the blades are caused to deform forwardly as shown by the dotted line in FIG. 1, as will be more fully described hereinafter.

Disposed immediately downstream of the first stage blades 39, is the first stage of fan stator vanes 46 which are attached to the fan stator case in a conventional manner and extend radially inward across the duct to change the direction of airflow. The radially inner end is attached to a ring 47 having a seal 48 disposed between the vanes and the stage 2 disc 18 in a manner well known in the art.

Referring to the structure of the flap 31 in greater detail as seen in FIGS. 2 and 3, it includes a principal airfoil portion 49 having leading and trailing edges 51 and 52, and having rigidly attached to its outer and inner ends, the trunnions 32 and 33, respectively, for selective rotation about the axis indicated by the dashed lines. On the radially outer corner of the downstream edge of the flap, the principal airfoil portion 49, which is preferably fabricated from a metal material, narrows out to a tapered surface 53 to facilitate the attachment of a corner section 54 thereto. The corner section 54 is formed of a composite material such as a graphite-epoxy or the like and is secured to the principal airfoil portion 49 to complete the desired airfoil shape of the strut. The corner section 54 is preferably formed by bonding together in symmetrical form a pair of layers 56 and 57 such that the leading edges form a V-shaped slot 58 which fits over the tapered surface 53 of the principal airfoil trailing edge and is rigidly bonded thereto by way of an adhesive or the like.

In actual operation, when a foreign object such as a bird or ice is ingested into the duct airflow, the fan blades 39 may be loaded so as to deform forwardly as shown by the dotted lines in FIG. 1 to cause interference with the trailing edge of the flap 31. When this occurs, the composite corner section 54 is impacted by the leading edge of the blades 39 and tends to break off and pass through the system. It is preferable that the corner section breaks into smaller pieces so as not to cause any secondary damage downstream, but even if the entire corner section breaks off in one piece, it will subsequently be broken into smaller, relatively harmless pieces. Following the break away, the principal airfoil portion 49 of the flap 31 will remain intact to function as a relatively efficient airfoil, and the rotating fan blades 39 will continue to function without any damage being incurred thereto.

It will be readily apparent that the described flap represents a reduction of weight in the flap itself, but more importantly it allows a shorter, and therefore lighter, and cheaper engine. Further, it reduces both initial and secondary damage resulting from any major foreign object ingestion and it reduces the need for, and simplifies, the procedure for repair.

Although the interconnection between the principal airfoil portion 49 and the corner section 54 has been described in terms of a simple surface-to-surface bond, alternative and/or additional methods may be employed to bond these two sections together. For example, a woven fiber may be wrapped around the entire combination and then bonded to the flap to thereby increase the strength of the combination. With this configuration, the composite portion can still be easily broken away, with the woven fiber being left on the remaining portion to cause no interference with the normal operation of the system.

It will be understood that the present invention has been described in terms of a particular embodiment, but may take on any number of other forms while remaining within the scope and intent of the invention. For example, instead of the flap having a composite trailing edge portion, it may be preferable to have the leading edge of the fan blades comprised of a composite material which breaks away upon impact. One disadvantage of this configuration, however, is that the loss of a portion of the rotating fan blade would cause an imbalance in the system and a probable shut down of the engine. Another application of the present invention may be to apply a composite section to either a stator vane or a rotating vane of a compressor wherein mutual interference may occur.

Having thus described the invention, what is claimed as novel and desired to be secured by Letters Patent of the United States is:

1. An improved airfoil of the type for placement within an airstream duct in serial flow relationship with an adjacent downstream relatively rotatable airfoil and susceptible to being impacted thereby during certain airflow conditions wherein the improvement comprises:

a. a metal airfoil portion extending substantially radially within said duct; and b. a frangible airfoil portion attached to said metal portion and adapted to break away therefrom when said adjacent airfoil impacts thereagainst.

2. An improved airfoil as set forth in claim 1 wherein said improved airfoil is in upstream flow relationship with said adjacent airfoil and said frangible airfoil portion comprises a radially outward and rearward section thereof.

3. An improved airfoil as set forth in claim 1 wherein said improved airfoil comprises a stationary member for changing the direction of airstream flow.

4. An improved airfoil as set forth in claim 1 wherein said frangible airfoil portion comprises a composite material containing fibers.

5. An improved airfoil as set forth in claim 1 wherein said airfoil includes rotating means on the ends thereof so as to enable the variation in pitch of the airfoil within the airstream duct.

6. An improved airfoil as set forth in claim 1 wherein said metal airfoil portion is substantially larger than said frangible airfoil portion.

7. An improved airfoil as set forth in claim 6 wherein said frangible portion is connected to the radially outer portion of said metal airfoil portion.

* * * * *